(12) United States Patent
Frank

(10) Patent No.: US 6,450,122 B1
(45) Date of Patent: Sep. 17, 2002

(54) DECORATIVE WATER DISPLAY INCLUDING A LOW MAINTENANCE AQUATIC ANIMAL BASIN

(76) Inventor: Michael G. Frank, 204 Weeping Willow La., Fairfield, CT (US) 06432

( * ) Notice: Subject to any disclaimer, the term of this patent is extended or adjusted under 35 U.S.C. 154(b) by 101 days.

(21) Appl. No.: 09/608,346

(22) Filed: Jun. 29, 2000

(51) Int. Cl.[7] .......................... A01K 63/04; B05B 11/08
(52) U.S. Cl. ...................... 119/259; 119/260; 119/255; 239/17
(58) Field of Search .................... 119/259, 260, 119/221, 253, 255, 261; 239/17, 20

(56) References Cited

U.S. PATENT DOCUMENTS

| | | | | | |
|---|---|---|---|---|---|
| 3,815,547 A | * | 6/1974 | Willinger et al. | ............ | 119/259 |
| 5,108,594 A | * | 4/1992 | Giovanetti et al. | ......... | 210/151 |
| 5,942,105 A | * | 8/1999 | Leis | ............................ | 210/129 |
| 6,080,304 A | * | 6/2000 | Gomi | ........................... | 210/94 |
| 6,086,755 A | * | 7/2000 | Tepper | ....................... | 210/150 |
| 6,149,991 A | * | 11/2000 | Okuda | ......................... | 428/13 |

* cited by examiner

Primary Examiner—Charles T. Jordan
Assistant Examiner—Yvonne R. Abbott
(74) Attorney, Agent, or Firm—Ware, Fressola, Van Der Sluys & Adolphson LLP

(57) ABSTRACT

The present invention is a decorative water display including a low maintenance aquatic animal basin capable of supporting aquatic animals such as fish by using a specially designed filter which cooperates with a hollow base of a water sculpture, a water pump, and a basin containing water. This arrangement allows a water display with a water sculpture such as a statuette or rock formation to provide a decorative environment for supporting aquatic animals which is clean and odor free, which does not endanger the aquatic animals, and which has the unexpected result of requiring very low maintenance or de minimus maintenance.

14 Claims, 1 Drawing Sheet

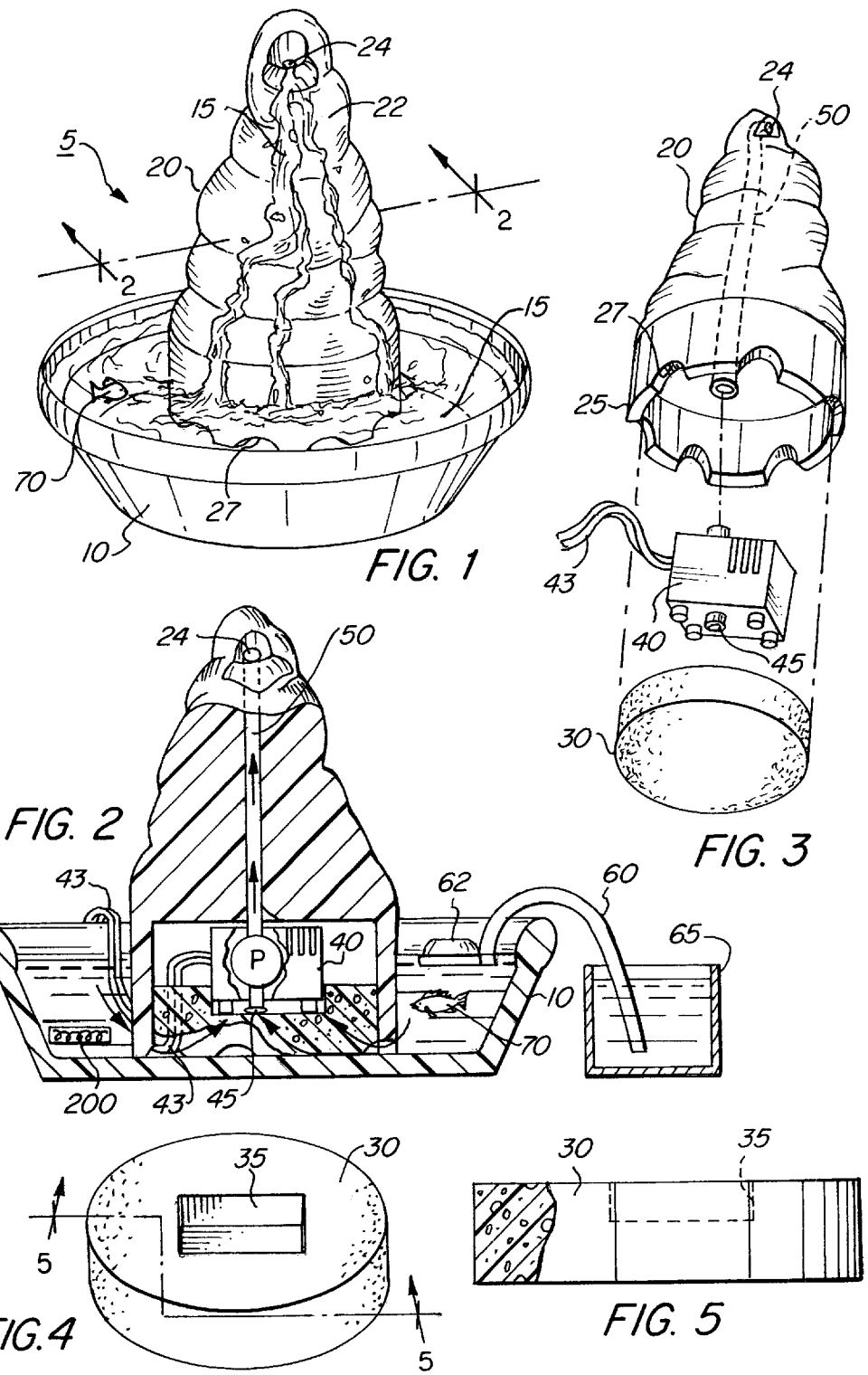

DECORATIVE WATER DISPLAY INCLUDING A LOW MAINTENANCE AQUATIC ANIMAL BASIN

FIELD OF THE INVENTION

The present invention relates to decorative water displays and aquatic animal tanks.

BACKGROUND OF THE INVENTION

The present invention relates to decorative water fountains/displays. Indoor water displays are popular and sold as relaxation devices and humidifiers. Typically, they create a small waterfall over simulated rock formations or the be like. It is also known for statuettes or sculptures to contain water fountain features wherein streams of water exit the statuette's mouth for example.

Hobbyists also have developed a wide array of fish tanks, and filters for fish tanks which filter contaminants from the tank such as algae, excess fish food, and fish contaminants. These tanks with filter arrangements require regular weekly maintenance including clearing algae from the glass of the fish tank and replacing the filter material every two weeks.

However, a display which combines a water sculpture fountain with a basin for keeping fish or other aquatic animals has not been practical because water sculptures are not made to incorporate filter apparatus and are often made of materials which are toxic to fish or other aquatic animals. Fountains are also typically permanently mounted to their bases, which makes removal of a filter for cleaning prohibitive. Further, the water pumps typically used for fountains and water sculptures have intake arrangements which would allow fish or other aquatic animals to enter the pump. Additionally, basins of water containing aquatic animals tend to develop algae and microorganisms which cloud the water and create an odor which makes them unsuitable for indoor and household use. Fountains also suffer from the problem that water subjected to routing through a fountain may become airborne and a significant percentage of the water becomes lost to the atmosphere rather than returning to the basin to support the aquatic animals and to maintain the water supply for the fountain. Fountains also suffer from airborne dust accumulating in any associated water pump. Therefore, use of a filter alleviates this problem.

SUMMARY OF THE INVENTION

The present invention provides a decorative water display which overcomes the problems listed above and which requires low maintenance, or de minimus maintenance. To accomplish this, a specially designed filter is fitted to a hollow base of a decorative water sculpture or statuette which is located in a basin containing water. The design and arrangement of the filter in the hollow base is dimensioned so that a water pump is positioned within the filter which prevents any aquatic animals kept in the basin from being introduced into the water pump. The arrangement of the hollow base allows water to flow under the base of the filter, or alternatively, the base may contain passages, apertures, or the base may be made of porous material to allow water to reach the filter. The filter cleans the water of suspended matter and maintains a healthy biological environment for aquatic animals including providing an environment for beneficial bacteria which consume particulates and other water impurities. The filter is preferably made of foam or sponge like material, but may also use polyester filling material. Once the water is filtered, it is routed through the water sculpture to an opening where it exits to the exterior surface of the water sculpture and subsequently cascades down to the basin. The cascading effect may be augmented by step-like formations or uneven formations on the surface of the water sculpture. During operation some of the water in the system is typically lost to the atmosphere. If the invention is placed in an indoor room, the invention also provides humidification. The cascading effect of the water falling downward over the face of the water sculpture also produces a relaxing water falling image and sound to an observer. Thus, the present invention can be used as part of a relaxation exercise such as a meditation. The cascading effect also functions to oxygenate the water.

Overall, the combined filtering and cascading over the water sculpture of the present invention results in the unexpected result of providing a low maintenance or de minimus maintenance aquatic basin for aquatic animals. This is because the water is moving over the sculpture and moving in the basin, thus it is well oxygenated, aerated, and partially evaporated during the cascading, and because the filter cleans the water of suspended matter and maintains a healthy biological balance. This balance is augmented by the filter providing and creating an environment for beneficial bacteria that consume water impurities. All of these factors result in water which is clear and free of odors, particles, waste, and growth such as algae. Thus, the only maintenance required is replacing any water lost during the process, and replacement of the filter after about six months to one year depending on the number of aquatic animals present in the basin. This is an unexpected result and a vast improvement over conventional aquatic animal tanks which require weekly maintenance. A disposable activated carbon filter can be optionally placed over a foam filter for extra clarity and filtration and to eliminate odors. The present invention can also be incorporated as a top for a table, a glass table or transparent table.

Therefore, it is a first object of the invention to provide a decorative water display comprising a decorative water display with a basin for holding water and aquatic animals, a water sculpture having a hollow base dimensioned to be positioned on a floor of the basin, or above the floor on posts, and having water passages for providing water to flow into the hollow base and having an inner water conveying conduit for providing water from the hollow base to an upper opening, a water pump positioned within a recess of a filter arranged inside the hollow base of the water sculpture, the water pump providing water under pressure to the conduit in order to expel water to an outer surface of the water sculpture via said upper opening, and a filter located within the hollow base and arranged between a water input of the water pump and the water passages of the hollow base, the filter having a recess formed therein for filtering in particulate matter from the water and preventing aquatic animals from being drawn into the pump. A water level sensing switch with a pump, located in the basin, may control an external water source to automatically maintain a desired water level in automatic fashion.

A second object of the invention is to provide a decorative water display with a basin for holding water and aquatic animals, a water sculpture having a hollow base dimensioned to be positioned over a floor of the basin so as to allow water to flow into the hollow base, a filter located within the hollow base, a water pump dimensioned to be positioned in relation to the filter, a water conveying conduit located in the water sculpture connected at one end to the water pump, and the conduit having an opening at the other end for expelling water to an outer surface of the water sculpture. The filter filters particulates and contaminants from the water and prevents aquatic animals from being drawn into the pump. The filter may contain a recess dimensioned to receive the water pump. The water sculpture may be in the form of a statuette. The water sculpture may be in the form of a rock formation. A water level sensing switch may be located in the basin which controls the water source to maintain a desired water level in automatic fashion. The filter may be removable from the hollow base for cleaning. The filter may also be optionally located outside the base.

It is a third object of the invention to provide a water filter for use with a decorative water display including a water sculpture mounted in a basin containing water including a water permeable element which does not allow particulate matter to pass through the element while allowing water to pass through the element, the element formed to fit within a hollow base of the water sculpture, the filter containing a recess dimensioned to receive a water pump, and the filter dimensioned to fit snugly within said hollow base so that fish or other aquatic animals located in the basin are blocked from entering the hollow base. The filter is removable from the hollow base for cleaning.

BRIEF DESCRIPTION OF THE DRAWINGS

FIG. 1 is a perspective view of a decorative water display including a basin for keeping fish or other aquatic animals or other aquatic animals that is the subject of the present invention.

FIG. 2 is a cross sectional view of the decorative water display taken along line 2—2 of FIG. 1.

FIG. 3 is an exploded view of a part of the decorative water display that was shown in FIG. 1.

FIG. 4 is a perspective view of a filter of the decorative water display which was shown in FIG. 1.

FIG. 5 is a cross sectional view of the filter taken along line 5—5 of FIG. 4.

DETAILED DESCRIPTION OF THE INVENTION

FIG. 1 shows the present invention as it appears in operation. Shown is a decorative water display 5. It is readily seen that the invention includes a water sculpture 20 mounted in a basin 10 containing water 15 for supporting aquatic animals 70. The water 15 is drawn under the water sculpture 20 through water passages 27 of the water sculpture 20 and up through the water sculpture 20 via a water pump (P), hereinafter labeled 40, and conduit 50 shown in FIGS. 2 and 3. The water 15 is filtered by a filter 30 located in the hollow base 25. The arrangement of the filter 30, hollow base 25, and water pump 40 prevents aquatic animals from being drawn into the water pump 40.

As seen in FIGS. 2 and 3, to set up the present invention for use, first the filter 30 and the water pump 40 are inserted into the hollow base 25 of a water sculpture 20 so that all three elements fit snugly together. As seen in FIGS. 4 and 5, in one embodiment, the filter 30 contains a recess 35 which is dimensioned to receive the water pump 40. Alternatively, the water pump 40 may rest upon the top of the filter 30. Next, referring to FIGS. 1 and 2, the water sculpture 20 containing the water pump 40 and filter 30 is mounted to the basin 10 containing water 15 suitable for keeping live fish or other aquatic animals 70. The reverse procedure is used to remove the filter 30 from the hollow base 25 in order to clean the filter 30. As seen in FIG. 2, when installed in place within the hollow base 25, the filter 30 is located between a water intake 45 of the water pump 40 and the water passages 27 which allows water 15 from the basin to enter the hollow base 25.

Referring to FIG. 3, it can be readily seen that water enters the filter 30 from beneath the hollow base 25 and is further propelled vertically through a water conveying passage 50 of the water sculpture 20 by the water pump 40. In the embodiment shown, the water pump 40 is electric and has a wire 43 which is fed below the base of the water sculpture 20 to a power source (not shown). The water 15 exits through an opening 24 and returns along an outer surface 22 of the water sculpture 20 to the basin 10 via gravity.

In operation, once the invention is set up, fish or other aquatic animals may be introduced into the basin to live. An important feature of the present invention is that the filter 30 prevents the fish or other aquatic animals from entering the water pump 40. Over time, particulate matter such as fish food and contaminants collect in the basin. The constant flow of water in the basin 10 generated by the water pump 40 causes a slight current to exist in the basin 10. This current carries the particulate matter to the filter 30 where it collects, thereby filtering the water in the basin 10. Beneficial bacteria (not shown) are created in the filter. These bacteria consume particulates and other water impurities. The water also becomes aerated when it cascades down the outer surface 22 of water sculpture 20 when returning to the basin 10. This oxygenates the water supply for the fish or other aquatic animals. This cascading water effect also serves to humidify the air in a room wherein the present invention is placed. The structure of the patent invention needs low maintenance or almost no maintenance because the cascading and filtering produce the unexpected result of providing clear, odor free, and oxygenated water to the aquatic basin, which extends the life of the filter dramatically, and eliminates weekly cleaning of the basin. The cascading effect also provides a relaxation effect and may be used in meditation. The present invention may also be envisioned for outdoor applications wherein ambient temperatures are mild.

A further embodiment of the invention makes use of an additional water source 60 for refilling the basin 10. This may be in the form of a hose 60 connected to a water supply 65 for example. This embodiment may also optionally make use of a switch/pump 62 which senses the water level such as a float switch and which can pump water. The switch/pump 62 could then automatically replenish the basin 10 water supply. This also contributes to the low maintenance overall character of the present invention.

The basin may also include a heater 200.

The display may also form the top of a table for use with table legs.

The scope of the invention is not intended to be limited to any particular form of the water sculpture. Embodiments are envisioned where the water sculpture is a rock formation, a step-like formation, statuette, or other decorative piece. The scope of the invention is also not intended to be limited to any particular form of the filter configuration. For example, the filter may be located outside of the base. Embodiments are envisioned in which the filter has no recess and the water pump simply rests on top of the filter. The scope of the invention is also not intended to be limited to any particular form of introducing water into the basin or of introducing water from the hollow base to filter and pump. Embodiments are envisioned in which the hollow base has apertures for channeling water from the basin to the filter. It is also envisioned to have the hollow base be made of a porous material for an additional filtering effect.

While in the foregoing specification, a few embodiments of the invention have been set forth for purposes of making a complete disclosure, it will be apparent to those skilled in the art that numerous changes may be made without departing from the spirit and principles of the invention.

What is claimed is:

1. A water filter for use with a decorative water display including a water sculpture mounted in a basin containing water comprising:

a water permeable element which does not allow particulate matter to pass through said element while allowing water to pass through said element;

said element formed to fit within a hollow base of said water sculpture;

said filter containing a recess dimensioned to receive a water pump; and said filter dimensioned to fit snugly within said hollow base so that fish or other aquatic animals located in said basin are blocked from entering said hollow base.

2. The filter of claim 1 wherein:

said filter is removable from said hollow base for cleaning.

3. The filter of claim 1 wherein:

said filter is made of foam.

4. The filter of claim 1 wherein:

said filter filters particulates and other water impurities from the basin using bacteria created by operation of said filter said bacteria consuming particulates and other water impurities.

5. A decorative water display including a low maintenance aquatic animal basin comprising:

a basin for holding water and aquatic animals;

a water sculpture having a hollow base dimensioned to be positioned on a floor of said basin and having water passages for providing water to flow into said hollow base and having an inner water conveying conduit for providing water from said hollow base to an upper opening;

a water pump having a water input and being arranged inside said hollow base of said water sculpture, said water pump providing water under pressure to said conduit in order to expel water to an outer surface of said water sculpture via said upper opening to aerate said water and to humidify a surrounding airspace; and a filter located within said hollow base, said filter having a recess with said water pump arranged therein, said filter-being arranged between a water input of said water pump and said water passages of said hollow base, said filter having a recess formed therein, said filter for filtering particulates and contaminants from said water and preventing aquatic animals from being drawn into said water pump.

6. The display of claim 5 further comprising:

a water level sensing switch with a water pump located in said basin which controls a water source to maintain a desired water level in automatic fashion.

7. The display of claim 5 wherein the particulates and contaminants are filtered by creating bacteria in the filter which consume particulates and other water impurities.

8. The display of claim 5 wherein the display forms a top of a table.

9. The display of claim 5 wherein the basin includes a heater.

10. A decorative water display comprising:

a basin for holding water and aquatic animals;

a water sculpture having a hollow base dimensioned to be positioned over a floor of said basin so as to allow water to flow into said hollow base;

a filter located within said hollow base;

a water pump dimensioned to be positioned in relation to the filter;

a water conveying conduit located in said water sculpture connected at one end to said water pump, and said conduit having an opening at the other end for expelling water to an outer surface of said water sculpture;

said filter filtering particulates and contaminants from said water and preventing aquatic animals from being drawn into said water pump.

11. The display of claim 10 wherein:

said filter contains a recess dimensioned to receive said water pump.

12. The display of claim 10 wherein:

said water sculpture is in the form of a statuette.

13. The display of claim 10 wherein:

said water sculpture is a rock formation with a step-like profile.

14. The display of claim 10 further comprising:

a water level sensing switch with a water pump located in said basin which controls said water source to maintain a desired water level in automatic fashion.

* * * * *